United States Patent [19]
Chang

[11] Patent Number: 5,997,877
[45] Date of Patent: Dec. 7, 1999

[54] METHOD OF EXTRACTION OF COMMERCIALLY VALUABLE FRACTIONS OF FENUGREEK

[75] Inventor: Peter Chang, Saskatoon, Canada

[73] Assignee: Emerald Seed Products Ltd., Saskatchewan, Canada

[21] Appl. No.: 09/199,649

[22] Filed: Nov. 25, 1998

[51] Int. Cl.⁶ .................................................. A01N 65/00
[52] U.S. Cl. ......................................................... 424/195.1
[58] Field of Search ........................................... 424/195.1

[56] References Cited

U.S. PATENT DOCUMENTS 5,658,571  8/1997  Gopalan et al. ...................... 424/195.1

OTHER PUBLICATIONS

Computer Abstract Biosis 1993:210770 Stark et al British Journal Nutrition (1993)vol. 69, No. 1 pp. 277–287.
Computer Abstract Biosis 1991:317511 Osman et al Nahrung (1991) 35 (3) pp. 303–308.
Computer Abstract Biosis 1988:94699 Elujoba et al Fitoterapia (1987) 58(3) pp. 197–199.
Computer Abstract Caba 74:63057 Shankaracharya et al "Journal Food Science & Tech" (1973) vol. 10 No. 4 pp. 179–181, 1977.
Computer Abstract Agricola 93:75538 Stark et al "British Journal Nutrition" Jan. 1993, vol. 69, No. 1 pp. 277–287.

*Primary Examiner*—Herbert J. Lilling
*Attorney, Agent, or Firm*—Frost & Jacobs LLP

[57] ABSTRACT

A process for the fractionation of fenugreek seeds (*Trigonelle foenum-graecum*) and extraction of the various fractions thereof. The process has a high yield rate, and provides a number of high-quality fractions of the fenugreek seed including a soluble dietary fiber fraction, de-flavored fenugreek seed, high-protein fenugreek meal, and dioscin and other saponins, along with the fenugreek oleoresins which have conventional commercial use.

38 Claims, No Drawings

5,997,877

METHOD OF EXTRACTION OF COMMERCIALLY VALUABLE FRACTIONS OF FENUGREEK

This invention is in the field of methods of extraction and purification of various commercially useful fractions of seeds, and in particular deals with the fractionation of fenugreek.

BACKGROUND

Fenugreek (*Trigonella foenum-graecum*) has attracted considerable interest as a natural source of soluble dietary fiber and diosgenin (sapogenins). The fenugreek seed contains a central hard, yellow embryo surrounded by a corneous and comparatively large layer of white, semi-transparent endosperm. This endosperm contains galactomannan gum. The endosperm is surrounded by a tenacious, dark brown husk. The color of the gum fraction depends upon the amount of outer husk (brown color) and cotyledon (yellow color) present.

There are commercial uses for the various fractions of the fenugreek seed. The commercial fenugreek oleoresins are used as an ingredient for imitation maple flavors and is effective in butter, butterscotch, black walnut, nut and spice flavors. Another fraction of the fenaugreek seed has been found to be a quantity of saponins. Fenugreek seed saponins are steriodal in nature with diosgenin as the main sapogenin. Disogenin is used by the drug industry as a precursor to progesterone (steriod hormones) which is used in the manufacturing of oral contraceptives.

Currently, the pharmaceutical industry use either synthetic or natural diosgenin for progesterone production. Some manufacturers are very apprehensive in switching to natural product because of supply and impurity problems associated with the natural product and as such the reliable production of natural diosgenin would have significant market potential.

Saponins have many flavoring, sweetening, antioxidant, foaming, complexing, sequestration, anticarcinogenic and antimicrobial properties. They could be used as an antioxidant, emulsifier, surfactant, ingredient for nutraceutical in food, drug, health food and cosmetic industry and as such represent another value-added fraction for recovery. Until recently, saponins have been largely overlooked except in cases where their presence was considered toxic. There are human benefits to the use of galactomannans as well. In particular, it has been reported that fenugreek galactomannan is most evident in the lowering of cholesterol in both liver and blood plasma.[1]

[1] A. J. Evans et al., "Relationship Between Structure and Function of Dietary Fiber: A Comparative Study of the Effects of Three Galactomannans on Cholesterol", (1992) *British J. Nut*, 68(1):217–229.

SUMMARY OF THE INVENTION

Fenugreek is a source of soluble dietary fiber and other products. It is the object of this invention to fractionate the fenugreek seed and purify the various fractions using a commercially feasible processing method, to maximize the total value of all fractionated products from the process.

There is provided in the present embodiment a process for the recovery of substantially pure extracts (oleoresins and saponins) from fenugreek seed (*Trigonelle foenum-graecum*), said process comprising mixing the fenugreek seed with a solvent for a period of contact time at a certain temperature such that certain seed components of the fenugreek seed are absorbed by the solvent; separating the extracted fenugreek seed from the solvent, which solvent now contains seed components; and separating the seed components from the solvent, to yield seed components and spent solvent.

It is anticipated that the process could be conducted in either a sequential batch or continuous feeding mode. The extraction recovery ratio of the process might also be improved by adding the extracted fenugreek seed to a fresh quantity of solvent and running second or additional extractions.

In a second embodiment of the invention, the extraction of soluble fiber is accomplished by extracting fenugreek seed material with a solvent at a constant temperature for a period of contact time; separating said solvent into heavy and light phases; precipitating the light phase with a precipitating agent to yield precipitated gum; separating the precipitated gum from the remainder of the light phase by solid/liquid separation; washing said precipitated gum; and drying same. The solvent used in the preferred embodiment of this process is water.

Precipitation in this second embodiment is accomplished by mixing the light phase of the solvent with a precipitating agent such as, but not limited to, anhydrous ethanol. The separation of the light phase of the precipitated solvent from the heavy phase thereof is accomplished by centrifugation or filtration, and the washing of the heavy phase, being precipitated gum, comprises mixing said heavy phase with a washing agent for a period of washing time, then separating the washed heavy phase from the washing agent. The washing step might be carried out a second or numerous times to improve the cleanliness of the final product.

The use of a sulfiting agent along with the solvent in this embodiment provides a cleaner end product.

The extracted fenugreek seed from the first embodiment of the process might be used as the starting material in the second embodiment.

The extraction recovery ratio by the two embodiments might be improved by flaking the fenugreek seed before the solvent to extraction, possibly using a roller mill and screens, before the extraction of the soluble fiber. By tempering, flaking or milling the fenugreek seed before the solvent extraction, extraction recovery ratios might be improved and contact times lessened.

Valuable fenugreek fractions are produced, including a clean and soluble dietary fiber fraction, and fenugreek oleoresins.

DETAILED DESCRIPTION OF THE INVENTION

The first embodiment of the present invention is the process for the recovery of oleoresins from fenugreek, said process comprising mixing the fenugreek seed with a solvent for a period of contact time at a certain temperature such that certain seed components of the fenugreek seed are absorbed by the solvent; separating the extracted fenugreek seed from the solvent, which solvent now contains seed components; and separating the seed components from the solvent, to yield seed components and spent solvent.

To now examine the detail of the oleoresin recovery process. In order to maximize the extraction and recovery of valuable products from the fenugreek seed, the fenugreek seeds are flaked in a flaking mill or the like in advance of extraction, to yield fenugreek flakes. The optimal moisture content for flaking fenugreek seeds is in the area of 14% to 20%, and more preferably at 16%, which results in excellent flakes with minimum fines and breakage. The fenugreek seed can be tempered in advance of the flaking operation, if necessary, in order to provide the optimal moisture content for a better result in the flaking process.

Following the flaking of the fenugreek seed, oleoresins are recovered using a solvent extraction process. The solvent extraction process is started by slurrying and agitating a quantity of fenugreek flakes with a quantity of solvent in an extractor/agitator at a constant temperature for a contact period.

The constant temperature for the extraction is in the range of 5 to 80 degrees Celsius. In the present embodiment, the constant temperature for the extraction is 60 degrees Celsius.

The contact period is in the range of 30 to 600 minutes. The contact period in the present embodiment is 120 minutes.

The solvent used is a polar alcohol, for example an alkyl alcohol such as methanol, ethanol, propanol, isopropanol and their solvent water mixtures, more preferably 95% ethanol which is the solvent used in the present embodiment.

The ratio of fenugreek flakes to solvent is in the range of 1:2 to 1:20 (w/v). In this embodiment the ratio of fenugreek flakes to solvent is 1:3 w/v. It will of course be understood that various solvents, solvent/water mixtures, extraction temperature, contact time, or fenugreek flakes to solvent ratios could be used without departing from the scope and intent of this invention and such substitution is contemplated within the scope of the present invention.

Following this extraction/mixing, the slurry is separated into a liquid slurry fraction being filtrate and a solid slurry fraction being wet fenugreek flakes. Separation is accomplished by a sieve, filter press, decanter, centrifuge or the like. The filtrate contains oleoresins, which in turn contain saponins including dioscin. The solid fraction can, at this point, either be dried for further processing or extracted again with a fresh quantity of solvent in order to maximize oleoresin recovery.

The extraction process of the current invention is presented as a sequential batch process as demonstrated in the first embodiment but does not preclude the practice of the current invention in a counter-current extraction mode of two or more stages, or in an open tank extraction system using fenugreek flour/grit instead of fenugreek flakes.

Moving past the solvent extraction process, then, to the further processing of the filtrate and wet fenugreek flakes. Wet fenugreek flakes are desolventized in a desolventizer and/or solvent recovery system for further processing, resulting in extracted de-bittered fenugreek flakes. Further drying of these extracted de-bittered fenugreek flakes may be necessary in order to reduce the moisture content to a level safe for storage.

The oleoresins are recovered by removing the solvent from the filtrate to yield pure or substantially pure oleoresins. The solvent is removed by the use of a rotoevaporator or similar process. The oleoresins recovered thereby contain various saponins, including dioscin, and can be further processed to fractionate the oleoresins themselves.

The next object of the present invention is to recover soluble fiber from either virgin fenugreek seed or from the extracted de-bittered fenugreek flakes. A second embodiment of the invention is a process comprising fractionating the fenugreek seed material to be extracted; mixing fenugreek seed material with a solvent for a period of contact time at a certain temperature such that certain seed components of the fenugreek seed are absorbed by the solvent; separating the extracted fenugreek seed from the solvent, which solvent now contains seed components; and separating the seed components from the solvent by precipitating the solvent into heavy and light phases; separating said heavy and light phases, the light phase being spent solvent; washing said heavy phase; and drying said heavy phase.

Where the fenugreek seed material to be used is virgin fenugreek seed, the fenugreek seed material can be either ground or milled in advance of extraction.

The first step of this second embodiment is to further fraction the fenugreek seed material (derived either from virgin fenugreek seeds, or previously extracted fenugreek flakes) by roller milling and screening system. Roller milling consists of sifting the material over a screen into two parts, yielding an over fraction to the screen which in this case contains testa and an endosperm (hulls), and an under fraction to the screen which in this case is cotyledons. As in the case of the flaking of the raw fenugreek seed, the milling process is best carried out at an optimized moisture content, which might require tempering of the fenugreek seed material in advance of milling. The optimal moisture level for milling is in the range of 16% to 22%, and more preferably at 20%, moisture content. The milled over-fraction—the testa and endosperm—contains a high proportion of fiber and it is the next object of the present invention to recover this fiber in a tasteless odourless form for use in food products, by the second embodiment. Further drying of over- and under-fractions is necessary for safe storage.

The soluble fiber recovery process B is started by slurrying and agitating a quantity of the fenugreek milled over-fraction (derived from either previously extracted de-bittered fenugreek flakes or virgin fenugreek seeds), with a quantity of solvent in an extractor/agitator at a constant temperature for a contact period to sufficiently extract soluble gum from the fenugreek over-fraction.

In this embodiment the solvent used is hot water, and the ratio of fenugreek over-fraction to solvent is in the range of 1:20 to 1:200 w/v, and more preferably 1:40 to 1:80 w/v.

The constant temperature in this embodiment for the extraction is in the range of 15 to 95 degrees Celsius. The constant temperature in the present embodiment is 60 degrees Celsius.

The contact period is in the range of 30 minutes to 24 hours. The contact period in this embodiment is 4 hours.

The slurry is then separated by use of a centrifuge into heavy and light phases.

The light phase from the centrifuge can be further discolorated by mixing with activated carbon, removing carbon by filtration or centrifugation.

The discolored light phase is purified to render a gum preparation by mixing with a volume of a precipitating agent, which in this embodiment is anhydrous or 95% ethanol at an equal ratio to the light phase being extracted. In general, a polar alcohol such as methanol, ethanol, propanol, isopropanol, butanol etc. can be added to precipitate the soluble gum. The precipitating agent will be added to a final concentration of about 20% to about 90%, and the solution allowed to stand until a precipitate forms. Precipitated gum is formed as a heavy component in the precipitated light phase—this precipitated gum contains the soluble fiber extract.

The precipitated gum is then recovered either by filtration or centrifugation.

The precipitated gum is washed. This is accomplished by mixing the crude precipitated gum with a gum solvent using a low speed blender for a period of mixing time. In this case the gum solvent is a polar alcohol, for example an alkyl alcohol such as methanol, ethanol, propanol, isopropanol, butanol etc. The alcohol will be In the concentration of 20% to about 100%, more usually 50% to 100%, and the period of mixing time one to 20 minutes. The quantity of gum solvent used in the present embodiment is five to ten times the initial volume of fenugreek over-fraction from which the crude precipitated gum is extracted. The gum solids are then recovered from this mixture by centrifugation or filtration.

In order to increase the purity of the gum solids, the precipitated gum washing step outlined herein can be repeated one or more times.

The gum solids recovered from the crude gum washing process are then next dried. A number of drying processes can be used including oven drying, agitation drying, fluid bed drying, freeze drying or vacuum drying. In the present embodiment agitation drying is used. The dried gum solids contain a high proportion of fiber, which is clean in appearance, odorless, tasteless and soluble in water.

Dependent on the drying method and gum solvent used, the color of the gum solids can be improved by the addition of a sulfiting agent to the solvent in the gum extraction process. In the current embodiment sodium bisulfite was used as a sulfiting agent (containing 58.5% $SO_2$), and was added to the hot water at 0.01% to 0.4%, and more usually at 0.1% to 0.3%.

The gum solvent might be changed depending on the drying method to be used.

It will be understood that the use of seed flour as the fenugreek seed material to be extracted, rather than flakes or whole seeds, is contemplated within the scope of the present invention, along with whatever attendant changes to the remainder of the process outlined herein might be required.

The present invention is further illustrated by the following examples which are not intended to limit the effective scope of the claims.

EXAMPLE 1

Recovery of Oleoresins from Fenugreek

A quantity of fenugreek seeds was tested for moisture content. The initial moisture content in the fenugreek seed tested was around 6%. This is too dry for proper flaking for use in the extraction process of the present invention. The fenugreek seeds were tempered to a moisture content of 16%, 24 hr prior to the flaking operation. The seeds were flaked in a Turner flaking mill at a gap setting of 0.33 mm. The thickness of flake was 1.0 mm on average after flaking operation. Excellent flakes, with minimum fines and broken flakes, were produced.

4 kg of fenugreek flakes were extracted by solvent extraction in an agitator. The solvent used is 95% ethanol. The extraction was conducted with the ratio of fenugreek to solvent 1:3 w/v (12 liters of solvent were used), at 60° C. for 2 hr.

The resultant slurry was centrifuged at 9000 g for 15 main. The supernatant was filtered through a Whatman No. 4 filter paper. The oleoresins were recovered by removing the solvent from filtrate in a rotoevaporator at a temperature of 65 to 70 degrees Celsius. The spent material after extraction, being extracted fenugreek flakes, was dried at room temperature, yielding 3.4 kg of dry flakes.

The diosgenin content in the extracted fenugreek flakes was reduced to 0.14% (from 0.36% in fenugreek flakes) after this 95% ethanol extraction. The 95% ethanol solvent was also found to have a good debittering effect on the fenugreek flakes, and did not negatively affect the color of the meal after extraction. Besides bitterness removal, ethanol can also remove low molecular weight molecules such as sugars, fats, phenolics, glycosides, oligosaccharides, flavanoids, etc.

470.4 grams of oleoresin were yielded, with a diosgenin content of 1.4%. The oleoresin recovered was compared to two commercial samples. The test product and the commercial samples were similar in viscosity and color.

100 grams of the first extracted dry flakes was combined with an additional 300 ml ot 95% ethanol for a second extraction in an agitator for 120 minutes at 60 degrees Celsius, The slurry was again centrifuged to separate the solids from the solvent portion. After drying the solids at room temperature, 92.9 grams of second extracted dry flakes were yielded, which were bland in taste. The second filtrate was rotoevaporated again at 65 to 70 degrees Celsius, yielding an additional 4.0 g of oleoresin. Extraction ratios of the virgin fenugreek seed then it would appear can be improved by performing a second or multiple extraction of the fenugreek seed.

EXAMPLE 2

Recover of Soluble Fiber from Virgin Fenugreek Seeds

Fenugreek seeds were tempered, roller-milled and passed over a 64 GG screen. 100 grams of the milled fenugreek over-fraction was extracted in an agitator for 4 hours at 60 degrees Celsius, using water as the solvent at a ratio of 1:30 w/v. As a sulfiting agent, sodium bisulfite was used (containing 58.5% $SO_2$), and was added to the hot water at a volume of 0.13%.

After this extraction, the slurry was centrifuged at 4500×g for 25 minutes, to yield heavy and light components. The light phase from the centrifuge was precipitated by mixing with an equal amount of anhydrous ethanol, the precipitated gum produced thereby then recovered by further centrifugation.

The recovered crude gum (heavy phase from the centrifugation of the precipitated solvent) was then mixed with ten times the amount of starting fenugreek over-fraction of a washing solution, being anhydrous ethanol at a low speed using a waring blender for one minute. The washed gum solids were then recovered by centrifugation or filtration. The washing step was carried out twice. The recovered clean gum solids were then dried at room temperature with continuous agitation. Various drying methods including oven drying, freeze drying and vacuum drying were attempted but it was found that agitation drying at room temperature yielded the whitest product at the lowest cost.

39.5 grams of dry product was yielded, The soluble fiber content therein was 89.6%. The product was white, odorless, tasteless and soluble.

EXAMPLE 3

Recovery of Soluble Fiber from Previously Extracted Fenugreek Seed

The extracted fenugreek flakes yielded by the procedure of Example 1 were tempered to a moisture content of 20% for 48 hr. The tempered seeds or flakes were further fractionated by roller milling—sifting system into two parts—a fraction containing testa and an endosperm (over fraction to a screen) and a fraction containing cotyledons (under fraction to a screen). A screen of 4.5 RH was employed.

100 grams of the milled flake over-fraction was extracted in an agitator for 4 hours at 60 degrees Celsius, using water as the solvent at a ratio of 1:40 w/v. As a sulfiting agent, sodium bisulfite was used (containing 58.5% $SO_2$), and was added to the hot water at a volume of 0.13%.

After this extraction, the slurry was centrifuged at 4500×g for 25 minutes, to yield heavy and light components. The light phase from the centrifuge was precipitated by mixing with an equal amount of anhydrous ethanol, the precipitated gum produced thereby then recovered by further centrifugation.

The recovered crude gum (heavy phase from the centrifugation of the precipitated solvent) was then mixed with ten times the amount of starting fenugreek seed of a washing solution, being anhydrous ethanol at a low speed using a waring blender for one minute. The washed gum solids were then recovered by centrifugation or filtration. The washing step was carried out twice. The recovered clean gum solids were then dried at room temperature with continuous agitation. Various drying methods including oven drying, freeze drying and vacuum drying were attempted but it was found that agitation drying at room temperature yielded the whitest product at the lowest cost.

48.0 grams of dry product was yielded. The soluble fiber content therein was 96.9%. The product was white, odorless, tasteless and soluble.

Thus it can be seen that the invention accomplishes all of its stated objectives. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A process for the recovery of substantially pure extracts from fenugreek seed (*Trigonelle foenum-graecum*), said process comprising tempering the fenugreek seed to a moisture content in the range of 14% to 20%; flaking or milling the fenugreek seed; mixing the fenugreek seed with a solvent for a period of contact time at a certain temperature such that certain seed components of the fenugreek seed are absorbed by the solvent; separating the extracted fenugreek seed from the solvent, which solvent now contains seed components; and separating the seed components from the solvent, to yield seed components and spent solvent.

2. The process of claim 1 wherein the ratio of fenugreek seed to be extracted to solvent used is in the range of 1:2 to 1:20 on a dry weight-to-weight basis.

3. The process of claim 1 wherein the solvent is a polar alcohol.

4. The process of claim 3 wherein the solvent is 95% ethanol.

5. The process of claim 1 wherein the period of contact time is in the range of 30 to 600 minutes.

6. The process of claim 1 wherein the temperature of the solvent during the contact time is in the range of 5 to 80 degrees Celsius.

7. The process of claim 1 wherein the separation of the extracted fenugreek seed from the solvent is accomplished by centrifugation or filtration.

8. The process of claim 1 wherein the separation of the seed components from the spent solvent is accomplished by rotoevaporation or similar process.

9. The process of claim 1 wherein the extracted fenugreek seed is added to a fresh quantity of solvent and the process run again for second or additional extractions to improve the extraction recovery ratio.

10. The process of claim 1 wherein the process is conducted in a sequential feeding mode.

11. The process of claim 1 wherein the process is conducted in a continuous feeding mode.

12. A process for the recovery of substantially pure extracts from fenugreek seed (*Trigonelle foenum-graecum*), said process comprising tempering the fenugreek seed to a moisture content in the range of 14% to 22%; flaking or milling the fenugreek seed; mixing the fenugreek seed with a solvent for a period of contact time at a certain temperature such that certain seed components of the fenugreek seed are absorbed by the solvent; separating the extracted fenugreek seed from the solvent; which solvent now contains seed components; and separating the seed components from the solvent by precipitating the solvent into heavy and light phases; separating said heavy and light phases, the light phase being spent solvent and the heavy phase thereof being soluble gum; washing the soluble gum; and drying the soluble gum.

13. The process of claim 12 wherein the ratio of fenugreek seed to solvent used is in the range of 1:20 to 1:200 on a dry weight-to-weight basis.

14. The process of claim 12 wherein the solvent is water.

15. The process of claim 12 wherein the period of contact time is in the range of 30 minutes to 24 hours.

16. The process of claim 12 further comprising the addition of a sulfiting agent to the solvent.

17. The process of claim 16 wherein the sulfiting agent is sulfur dioxide gas and one or more of salts of sulfite, bisulfite and metabisulfite.

18. The process of claim 16 wherein the ratio of sulfiting agent added to the hot water is in the range of 0.01% to 0.4%.

19. The process of claim 12 wherein the temperature of the solvent during the contact time is in the range of 5 to 80 degrees Celsius.

20. The process of claim 12 wherein the separation of the extracted fenugreek seed from the solvent is accomplished by centrifugation or filtration.

21. The process of claim 12 wherein the precipitation of the solvent comprises mixing the solvent with a precipitating agent.

22. The process of claim 21 wherein the precipitating agent is added to create a final precipitating agent concentration in the range of 20% to 90%.

23. The process of claim 21 wherein the precipitating agent is a polar alcohol.

24. The process of claim 23 wherein the precipitating agent is 95% anhydrous ethanol.

25. The process of claim 12 wherein the separation of the light component of the precipitated solvent from the heavy component thereof is accomplished by centrifugation or filtration.

26. The process of claim 12 wherein the washing of the soluble gum comprises mixing said soluble gum with a washing agent for a period of washing time, then separating the washed soluble gum from the washing agent.

27. The process of claim 26 wherein the quantity of washing agent is in the range of five to ten times that of the amount of starting fenugreek seed used, by weight.

28. The process of claim 26 wherein the washing agent is a polar alcohol at a concentration in the range of 20% to 100%.

29. The process of claim 28 wherein the washing agent is 95% anhydrous ethanol.

30. The process of claim 26 wherein the period of washing time is in the range of one to 20 minutes.

31. The process of claim 26 wherein the soluble gum is separated from the washing agent by centrifiugation or filtration.

32. The process of claim 12 wherein the washing step is carried out a second or numerous times.

33. The process of claim 12 wherein the soluble gum is dried by way of agitation.

34. The process of claim 12 further comprising the fractionation of the fenugreek seed through a screen before mixing with the solvent.

35. The process of claim 34 wherein the screening is accomplished using a roller mill and screens.

36. The process of claim 1 further comprising the drying of the extracted fenugreek seed.

37. The process of claim 12 wherein the fenugreek seed to be extracted is virgin fenugreek seed.

38. The process of claim 12 wherein the fenugreek seed to be extracted is the extracted fenugreek seed yielded from the process of any one of claims 1 to 11.

* * * * *

UNITED STATES PATENT AND TRADEMARK OFFICE
CERTIFICATE OF CORRECTION

PATENT NO. : 5,997,877
DATED : December 7, 1999
INVENTOR(S) : Peter Chang

It is certified that error appears in the above-indentified patent and that said Letters Patent is hereby corrected as shown below:

Column 2, line 40, please delete the word --to-- directly before the word "extraction"
Column 5, line 6, "In" should read as --in--
Column 5, line 62, "main" should read as --min.--
Column 6, line 15, "ot" should read as --to--
Column 6, line 17, "Celsius," should read as --Celsius.--
Column 6, line 29, "Recover" should read as --Recovery--

Signed and Sealed this

Fifth Day of September, 2000

Q. TODD DICKINSON

*Attest:*

*Attesting Officer*     Director of Patents and Trademarks